A. J. JASMIN.
ADJUSTABLE VALVE CONTROLLER.
APPLICATION FILED DEC. 16, 1915.
1,194,631.
Patented Aug. 15, 1916.
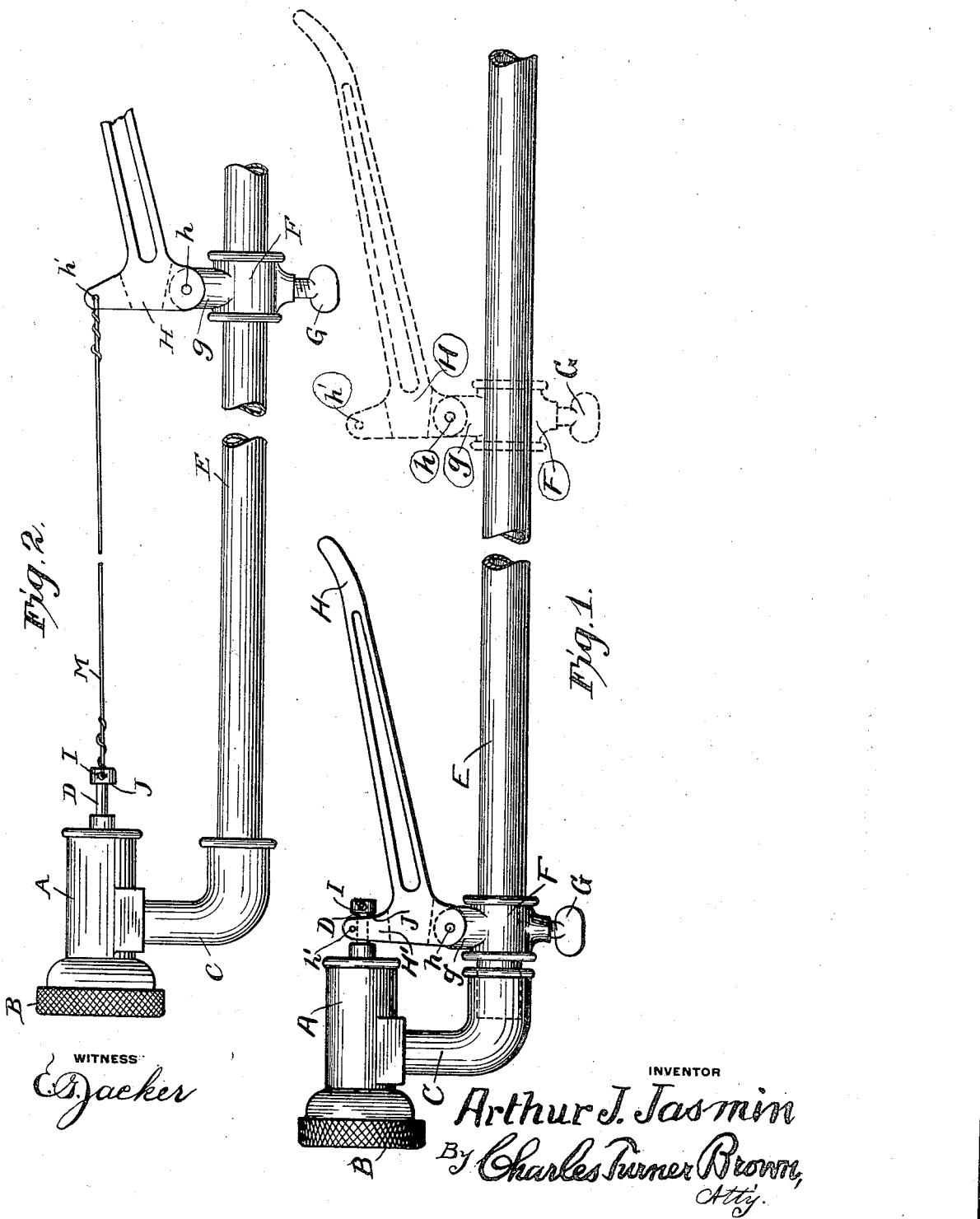
INVENTOR
Arthur J. Jasmin
By Charles Turner Brown,
Atty.

UNITED STATES PATENT OFFICE.

ARTHUR J. JASMIN, OF ALBERT LEA, MINNESOTA.

ADJUSTABLE VALVE-CONTROLLER.

1,194,631.   Specification of Letters Patent.   Patented Aug. 15, 1916.

Application filed December 16, 1915. Serial No. 67,245.

*To all whom it may concern:*

Be it known that I, ARTHUR J. JASMIN, a citizen of the United States, and a resident of Albert Lea, in the county of Freeborn, Minnesota, have invented certain new and useful Improvements in Adjustable Valve-Controllers, of which the following, when taken in connection with the drawing accompanying and forming a part hereof, is a full and complete specification.

This invention relates to devices adapted to control the un-seating of an automatically closing and yieldingly seated valve.

In valves of this description which are used in sprayer devices it often occurs that said valves are located in a place where it is difficult to approach the valve closely and the object of this invention is to obtain an adjustable valve controller which will permit the operating handle of the device to be positioned where access thereto can be easily obtained and where the same can be properly actuated.

Further objects are to obtain a device which is not easily gotten out of repair or broken and which can be maintained in operative condition at small expense.

The device embodying this invention is illustrated in the drawing attached hereto, in which—

Figure 1 is an elevation of a nozzle or valve of a sprayer system and of a section of a pipe of said system in which said valve is installed. Fig. 2 is an elevation of a nozzle involving the invention showing an additional connection between the operating lever and the shut-off pin.

A reference letter applied to designate a given part indicates said part wherever said letter appears.

A represents a shell of a nozzle or valve, and B is the discharge end of said nozzle.

C is an L, which is provided with an inlet passageway to shell A.

D is the shut off pin of the valve.

E is a pipe forming a part of the installation of a sprayer system, and said pipe is joined at one end to the L C.

F is a collar which is movable on pipe E, and G is a set screw by means of which said collar is rigidly secured in a determined place or position on said pipe. The broken lines indicating collar F and set screw G represent a determined position to which said collar F has been or may be moved on said pipe E from the position thereof which is indicated by the full lines.

$g$ is an abutment on collar F, and H is a lever which is pivotally attached to abutment G by pin or bolt $h$.

The shut off pin D, hereinbefore described, is provided with an aperture I and a shoulder J, and the lever H is provided with an extension $H^1$ and an aperture $h^1$ in said extension. Collar F may be so positioned on pipe E, as is illustrated in full lines, that extension $H^1$ will come in contact with shoulder J of the shut off pin when the free end of lever H is forced toward the pipe E (from the position which is illustrated in the drawing) thereby forcing said shut off pin toward the right, and thereby forcing the valve in the shell A off its seat. Said collar F may be moved from the last above described position (illustrated by full lines in Fig. 1) to a different position on said pipe E, as say to the position of said collar which is indicated by broken lines in Fig. 1 of the drawing, and when in said position the lever H is connected to the shut off pin D by means of the wire M, as is illustrated in Fig. 2. Wire M may be ordinary stove pipe wire. The wire M extends through apertures L in shut off pin D, and $h^1$, in lever H. When the collar F is in the position indicated by broken lines in Fig. 1, and by full lines in Fig. 2 of the drawing, the bolt G is turned firmly on to the pipe E, to rigidly maintain said collar in said adjusted or determined position, and the wire M is made of the suitable length to maintain the lever H in substantially the position in which said lever is illustrated in the drawing, when the valve of the device is seated.

When connected as last above described the forcing of the free end of the handle H toward the pipe E draws the shut off pin to unseat the valve of said pin in the same manner as when the part $H^1$ of said lever comes in contact with shoulder J as hereinbefore described.

It will be readily seen that the wire M being secured in the aperture I by threading it through said aperture and turning it over upon itself in the ordinary manner of securing the ends of ductile wire, the other end of said wire is readily threaded through the aperture $h^1$, and the right length of said wire M to maintain the lever H in substantially the position indicated by broken lines is readily determined; after which the wire may be cut off and turned back upon itself in the same manner as the other end thereof is secured in aperture J.

I claim:

A nozzle valve shell, an L connection attached to said shell, a shut off pin longitudinally movable in said shell, said pin provided with an annular recess, and a supply pipe attached to said L, in combination with a collar movable on said pipe, means to secure said collar in an adjusted position, an L-shaped lever pivotally mounted on said collar, the shorter arm of said lever provided with a forked end adapted to engage with the annular groove in said pin, said forked end and pin provided with apertures adapted to receive a flexible wire to connect said lever and pin when the collar is adjusted to a position on said pipe remote from said shell.

ARTHUR J. JASMIN.

In the presence of—
S. E. SEVERSON,
F. D. WOOD.

Copies of this patent may be obtained for five cents each, by addressing the "Commissioner of Patents, Washington, D. C."